(12) United States Patent
Nakamura et al.

(10) Patent No.: US 7,658,245 B2
(45) Date of Patent: Feb. 9, 2010

(54) MOBILE ROBOT

(75) Inventors: Ryosuke Nakamura, Hitachinaka (JP); Azusa Amino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 26 days.

(21) Appl. No.: 11/942,994

(22) Filed: Nov. 20, 2007

(65) Prior Publication Data

US 2008/0135312 A1     Jun. 12, 2008

(30) Foreign Application Priority Data

Nov. 20, 2006  (JP) .............................. 2006-312380

(51) Int. Cl.
*B62D 51/06* (2006.01)
(52) U.S. Cl. .......................................... 180/8.3; 901/1
(58) Field of Classification Search ........... 180/8.1–8.6; 74/490, 490.3; 901/1
See application file for complete search history.

(56) References Cited

U.S. PATENT DOCUMENTS

| | | | | |
|---|---|---|---|---|
| 4,241,803 A | * | 12/1980 | Lauber .................... | 180/8.1 |
| 4,834,200 A | * | 5/1989 | Kajita ..................... | 180/8.1 |
| 5,158,493 A | * | 10/1992 | Morgrey .................. | 446/355 |
| 5,159,988 A | * | 11/1992 | Gomi et al. .............. | 180/8.6 |
| 5,318,471 A | * | 6/1994 | Glovier ................... | 446/268 |
| 5,343,397 A | * | 8/1994 | Yoshino et al. ........... | 701/23 |
| 5,455,497 A | * | 10/1995 | Hirose et al. ............. | 318/568.12 |
| 6,462,498 B1 | * | 10/2002 | Filo ....................... | 318/568.12 |
| 6,564,888 B1 | * | 5/2003 | Gomi et al. .............. | 180/8.6 |
| 6,705,917 B2 | * | 3/2004 | Filo ....................... | 446/379 |
| 6,901,313 B2 | * | 5/2005 | Mori et al. ............... | 700/245 |
| 6,918,811 B1 | * | 7/2005 | Wang ..................... | 446/373 |
| 7,017,687 B1 | * | 3/2006 | Jacobsen et al. .......... | 180/8.3 |
| 7,111,696 B2 | * | 9/2006 | Miyazaki et al. .......... | 180/8.5 |
| 7,112,938 B2 | * | 9/2006 | Takenaka et al. .......... | 318/568.12 |
| 7,127,326 B2 | * | 10/2006 | Lewis ..................... | 700/258 |
| 7,143,850 B2 | * | 12/2006 | Takenaka et al. .......... | 180/8.6 |
| 7,278,501 B2 | * | 10/2007 | Mori et al. ............... | 180/8.5 |
| 7,348,746 B2 | * | 3/2008 | Ogawa et al. ............ | 318/568.12 |

FOREIGN PATENT DOCUMENTS

| | | |
|---|---|---|
| JP | 2001-138272 | 5/2001 |
| JP | 2005-288561 | 10/2005 |

* cited by examiner

*Primary Examiner*—Lesley D Morris
*Assistant Examiner*—Tashiana Adams
(74) *Attorney, Agent, or Firm*—Antonelli, Terry, Stout, & Kraus, LLP.

(57) ABSTRACT

There is provided a high-speed and stable robot apparatus realizing stable walking by surely grounding legs having wheels even on an irregular ground surface. The mobile robot includes a body having a control device and an inclination angle detecting device which detects an inclination angle and an angular velocity, and the plurality of legs each having a thigh part and a lower limb part. The thigh part is rotatable around an X-axis, which is a front direction with respect to the body, and around a Y-axis which is a side surface direction with respect to the body. The robot comprises wheels rotatable around the Y-axis and movable supporting parts rotatable around the Y-axis and capable of being grounded on a road surface, which are provided on lower portions of the lower limb parts. The robot switches its operation according to irregularities of the road surface between coaxial two-wheeled inverted pendulum control operation of moving with the wheels without grounding the movable supporting parts while maintaining the inversion and bipedal walking control operation of walking by controlling the grounding of the wheels and the movable supporting parts on the road surface.

8 Claims, 4 Drawing Sheets

MOBILE ROBOT

BACKGROUND OF THE INVENTION

The present invention relates to a leg-wheel type mobile robot having wheels at the tip of its leg and capable of moving on an irregular ground.

As a moving system of a robot, there are moving methods based on wheels and legs. In the moving method based on legs, walking is performed by controlling the attitude of the robot on the basis of a ZMP (Zero Moment Point) as standard. The ZMP is the center of reaction force at a grounding point, and is a point on the floor surface where the moment by the reaction force becomes zero. When the robot is made to walk, it is necessary to perform control of the walking in consideration of inertia force due to the movement of the robot itself, gravitational force applied to the robot, reaction force received from the floor, and the like. When a walking pattern is generated so as to make the ZMP settled within a convex support polygon of the foot sole of the robot, the robot can be made to walk without overturning.

As for the moving method based on wheels, there are known a moving method as represented by a motor vehicle, which has three grounding points or more and static stability, a method as used for a motorbike, which maintains lateral stability by using the angular momentum of a tire, and a method based on a wheeled inverted pendulum, for dynamically maintaining stability by feeding back an inclination angle and an angular velocity in an advancing direction of a movable body, as shown in JP-A-2005-288561.

The moving method based on wheels is characterized in that it is excellent in the moving efficiency and the moving speed, but has a large limitation on the environment, in which the robot can be moved, and low ground adaptability. Further, the moving method based on legs is inferior in the moving efficiency and the moving speed, but has high ground adaptability.

Thus, there is known a method, as described in JP-A-2005-288561, in which in order to utilize both the above advantages by the combination of wheels and legs, two-legged walking is realized by turning a wheel sideways and increasing the contact area of the sole, as needed. Similarly, there is known a method, as described in JP-A-2001-138272, in which in order to realize more dynamic and higher speed movement as compared with a normal walking operation, a leg-type mobile robot is made to perform roller-skating by being provided with roller-skating shoes.

BRIEF SUMMARY OF THE INVENTION

The method described in JP-A-2005-288561 has a disadvantage in stability because there is a period when the movable body is supported by only the wheel of one leg at the time of switching between the wheel movement and the leg movement. Further, in the method described in JP-A-2001-138272, the adaptability to irregularities on a road surface needs to be improved by suitably performing friction adjustment and elasticity designation to an attached wheel. Thus, in this method, the wheel is easy to be rotated and when walking is performed on an irregular ground, the wheel can be kicked off only to such an extent that the wheel is not rotated, which results in slow walking speed.

An object of the present invention is to provide a high-speed and stable robot apparatus by realizing stable walking in such a manner that switching between wheels and moving means for walking is stably performed, and a leg having the wheel is surely grounded even on an irregular ground surface having large irregularities.

In order to achieve the above object, a mobile robot according to the invention includes a body having a control device and an inclination angle detecting device adapted to detect an inclination angle and an angular velocity with respect to a gravity direction, and a plurality of legs each having a thigh part and a lower limb part, the thigh part being adapted to be rotatable around an X-axis, which is a front direction with respect to the body, and around a Y-axis which is a side surface direction with respect to the body. The mobile robot further comprises a wheel provided on a lower part of the lower limb part and adapted to be rotatable around the Y-axis, and a movable supporting part provided on the lower part of the lower limb part and adapted to be rotatable around the Y-axis and to be able to be grounded on a road surface, and is adapted to switch between a coaxial two-wheeled inverted pendulum control operation to effect movement by the wheels without grounding the movable supporting parts while maintaining inversion, and a two-legged walking control operation to effect walking by controlling the grounding of the wheels and the movable supporting parts on the road surface, according to irregularities of the road surface.

According to the invention, the mobile robot thus switches between the coaxial two-wheeled inverted pendulum control operation to effect movement by the wheels while maintaining the inversion and the two-legged walking control operation to effect walking by controlling the grounding of the wheels and the movable supporting parts on the road surface, according to the irregularities of the road surface. This enable the mobile robot to perform high speed movement by the wheels on the road surface having few irregularities, and to perform stable walking on the irregular ground surface by grounding the legs on a recessed part of the road surface.

Other objects, features and advantages of the invention will become apparent from the following description of an embodiment of the invention taken in conjunction with the accompanying drawings.

DETAILED DESCRIPTION OF THE INVENTION

Figure 1:
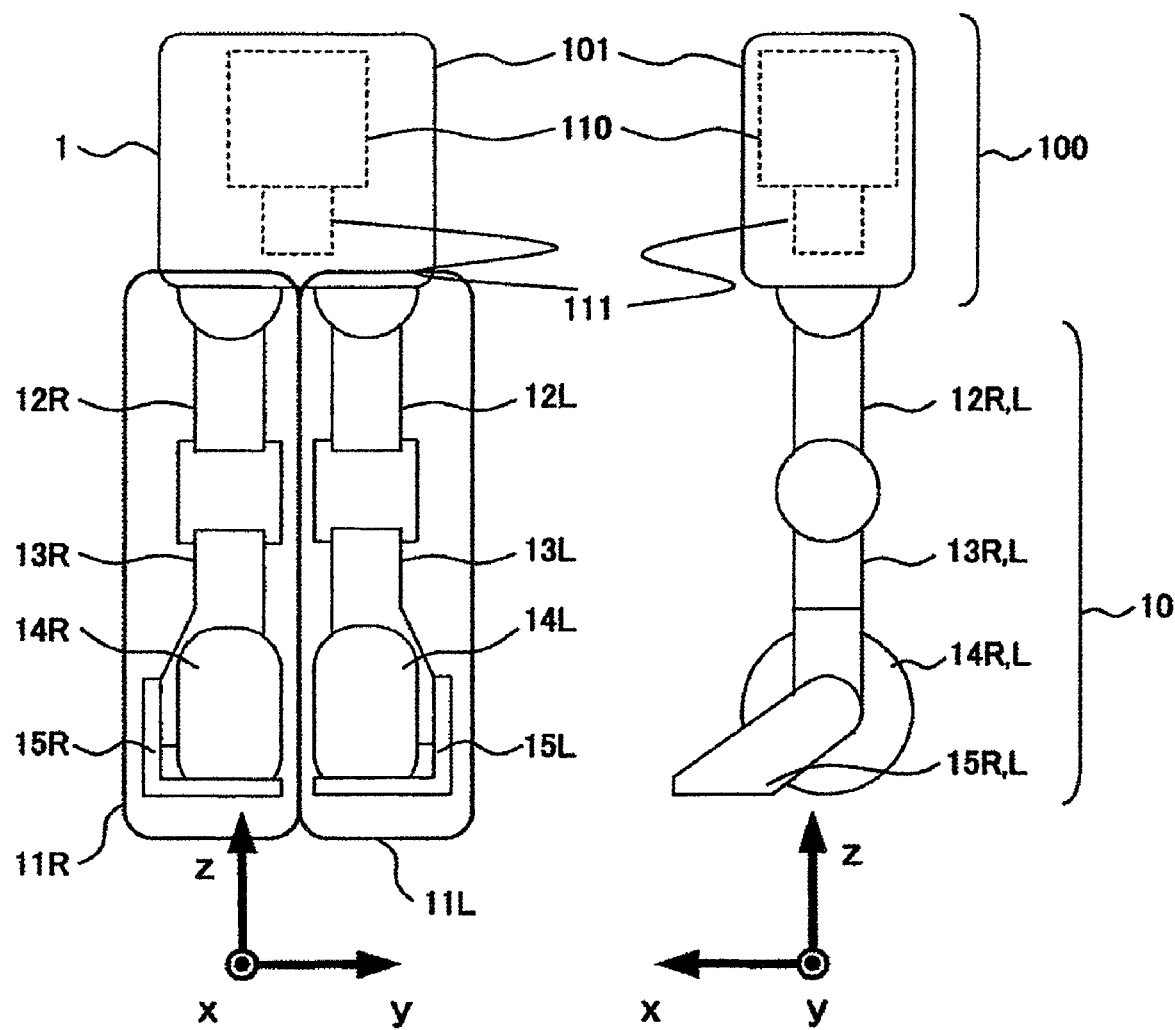
FIG. 1 shows a front view and a side view of an embodiment according to the invention.
Figure 2:
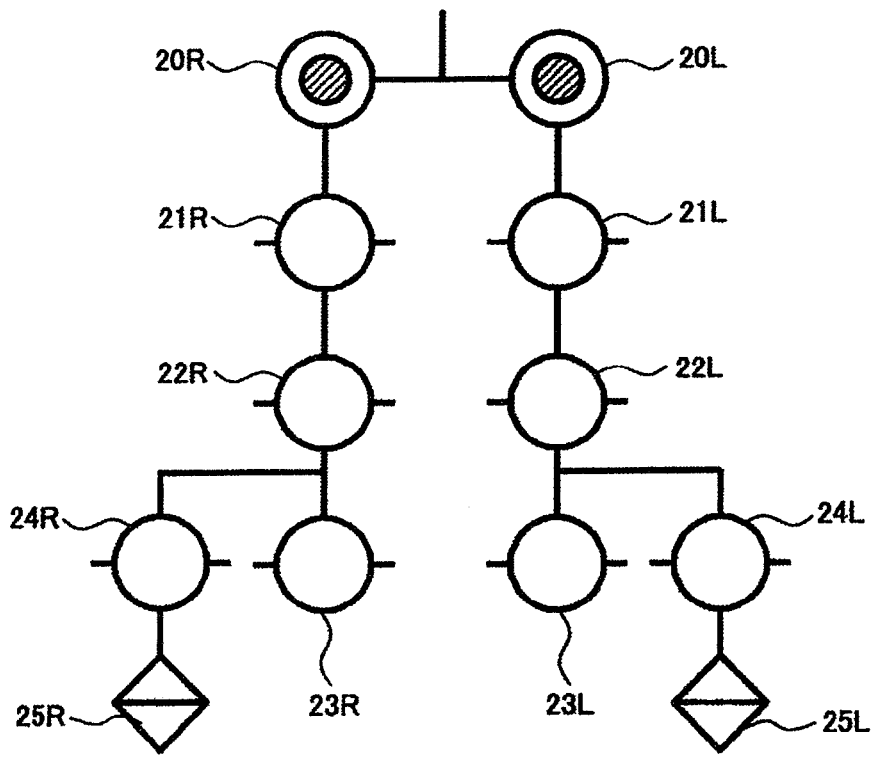
FIG. 2 is a schematic view showing a joint configuration in the embodiment according to the invention.

FIG. 1 schematically shows the entirety of a mobile robot, and FIG. 2 shows a joint arrangement.

The robot 1 comprises two sections of a leg section 10 and a body 100. The leg section 10 comprises right and left legs 11R and 11L, which are comprised of thigh parts 12R and 12L, lower limb parts 13R and 13L, wheels 14R and 14L, and movable supporting parts 15R and 15L, respectively. In order to distinguish the right and left parts of the leg, a letter "R" is added to the reference numerals for representing the right, while a letter "L" is added to the reference numerals for representing the left.

The body 100 is situated on the upper part of the right and left legs 11R, 11L and has a control device 110 which controls the operation of all the joints and the wheels, and an inclination angle detecting device 111 which detects an inclination angle and an angular velocity of the body with respect to the gravity direction. An X-axis is set to be in the robot front direction, a Y-axis is set to be in a side surface direction, and a Z-axis is set to be in a direction perpendicular to these directions. There are provided X-axis direction rotary joints 20R and 20L and Y-axis direction rotary joints 21R and 21L between the thigh parts 12R and 12L, and the body 100.

There are provided Y-axis direction rotary joints 22R and 22L between the thigh parts 12R and 12L, and the lower limb parts 13R and 13L. Under the lower limb parts 13R and 13L, axles 23R and 23L are attached in the Y-axis direction, and the wheels 14R and 14L are provided for rotation around the Y-axis. Further, under the lower limb parts 13R and 13L, the movable supporting parts 15R and 15L are similarly connected via Y-axis direction rotary joints 24R and 24L, and rotary joints 25R and 25L are also provided so as to be orthogonal to the Y-axis direction rotary joints 24R and 24L. The movable supporting parts 15R and 15L are made rotatable around the Y-axis and pivotable around the Z-axis.

The axes of rotation of the joints 24R and 24L are set to be the same as those of the axles 23R and 23L. Further, motors having an angle detecting function are attached to all the joints and the wheels and can generate torque specified by the control device 110.

In the case where a road surface has few irregularities, the robot 1 moves the joints 24R and 24L and the joints 25R and 25L to thereby fold the movable supporting parts 15R and 15L on the side of the wheels without grounding them, and performs wheel traveling at high speed under the coaxial two-wheeled inverted pendulum control. More specifically, the control device 110 acquires information on an inclination angle and an angular velocity of the body with respect to the gravity direction from the inclination angle detecting device 111, and information on wheel rotation angles and wheel rotation angular velocities from the wheels 14R and 14L, and the control device 110 moves the robot 1 by feeding back the information while maintaining the inversion.

When a conventional robot walks on the road surface having irregularities, the robot grounds its legs and thereafter performs walking by grounding the legs along the inclination of the road surface with use of joints of ankles and the like. However, in the case where the road surface has large irregularities, and where the setting area of the legs is not sufficient, the influence of the road surface irregularities is increased and lowers the stability.

The robot 1, in the case where the irregularities of the road surface are large, therefore performs bipedal walking while searching the irregularities of the road surface. The bipedal walking performed by the robot in correspondence with the irregularities of the road surface is realized by shifting the following states (steps).

(1) A single-leg supporting phase in which the right leg is raised and the whole body is supported by the left leg.

(2) A single-leg supporting phase in which the right leg is lowered to search a point where the right leg will be completely grounded.

(3) A double-leg supporting phase in which the right leg is completely lowered and the whole body is supported by the two legs.

(4) A single-leg supporting phase in which the left leg is raised and the whole body is supported by the right leg.

(5) A single-leg supporting phase in which the left leg is lowered to search a point where the left leg will be completely grounded.

(6) A double-leg supporting phase in which the left leg is completely lowered and the whole body is supported by the two legs.

"Complete grounding" is assumed to mean a state (step) where the wheel is grounded on the road surface in the state of being controlled not to be rotated with respect to the road surface and the movable supporting part is also grounded along the road surface so that the positional relation between the leg and the road surface is fixed.

Further, a state where the movement of the leg along the road surface is effected, while maintaining the contact between the leg and the road surface, in such a manner that the wheel is controlled to be grounded on the road surface but to be rotatable and the movable supporting part is floated from the road surface, is referred to as a wheel grounding state.

Further, the leg, which is completely grounded and is controlled not to change its position relative to the road surface, is referred to as a supporting leg, and the leg which is in the wheel grounding state or the leg whose wheel and movable supporting part are both floated from the road surface, is referred to as a swinging leg.

Figure 3:
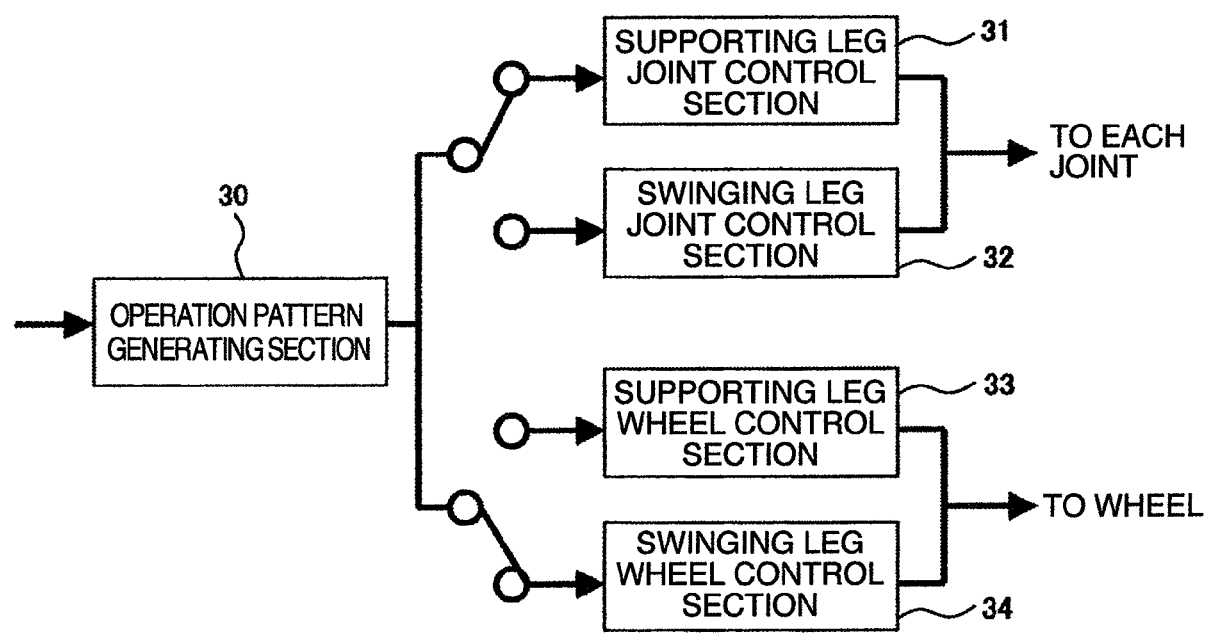
FIG. 3 is a control block diagram in the embodiment according to the invention.

FIG. 3 shows control blocks in the control device 110 during walking.

Operation patterns of the legs are set by time-sequentially arranging angle target values for all the joints in the legs 11R and 11L, except the wheel rotation joints 23R and 23L, which target values are generated by an operation pattern generating section 30 in the robot 1. The operation patterns of the legs will be described below. Representing here a center-of-gravity position vector of the whole body on a horizontal plane as $G_{XY}$, a height of center of gravity as $G_h$, the mass of the robot 1 as M, and torque generated by the movable supporting part as η, a relation between them and the ZMP position ZXY on the floor surface is expressed by the following formula by using the gravitational constant g.

$$Z_{xy} = G_{xy} - \frac{G_h}{g}\frac{d^2 G_{xy}}{dt^2} - \frac{\eta}{Mg} \qquad \text{Formula (1)}$$

Figure 5:
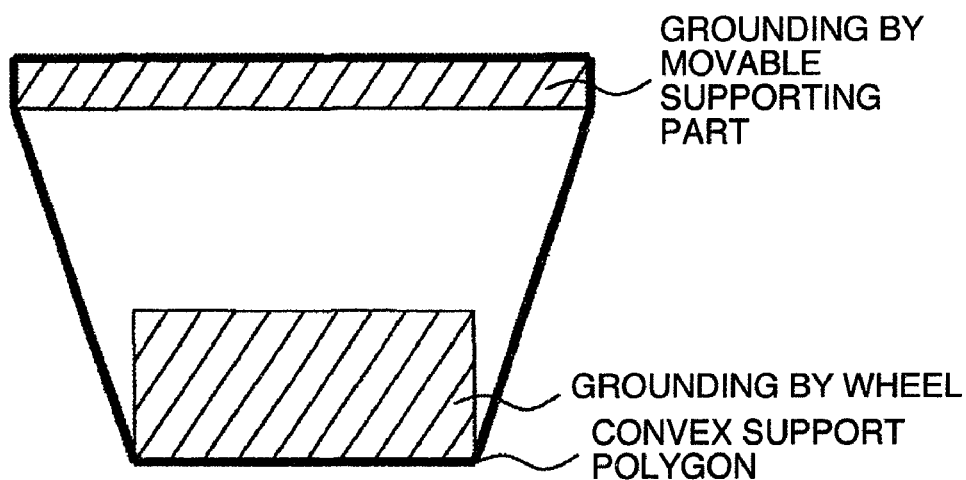
FIG. 5 is a plan view showing grounding of one leg in the embodiment according to the invention.

The operation pattern generating section 30 can obtain the position of center of gravity $G_{XY}$ and the height of center of gravity $G_h$ by calculation on the basis of joint angles of the whole body and an inclination angle which can be acquired from the inclination angle detecting device 111. The operation pattern generating section 30 generates an operation pattern of the leg, so that the ZMP obtained by formula 1 is maintained in the convex support polygon formed by one or two supporting legs. The convex support polygon means a minimum one of the convex polygons including all the grounded parts as shown in FIG. 5. Similarly, also in the case where both the legs are grounded, it is not regarded that there are two convex support polygons, but it is regarded that there is one large convex support polygon. The joints of the leg are subjected to position control so as to follow the generated operation pattern.

Figure 4:
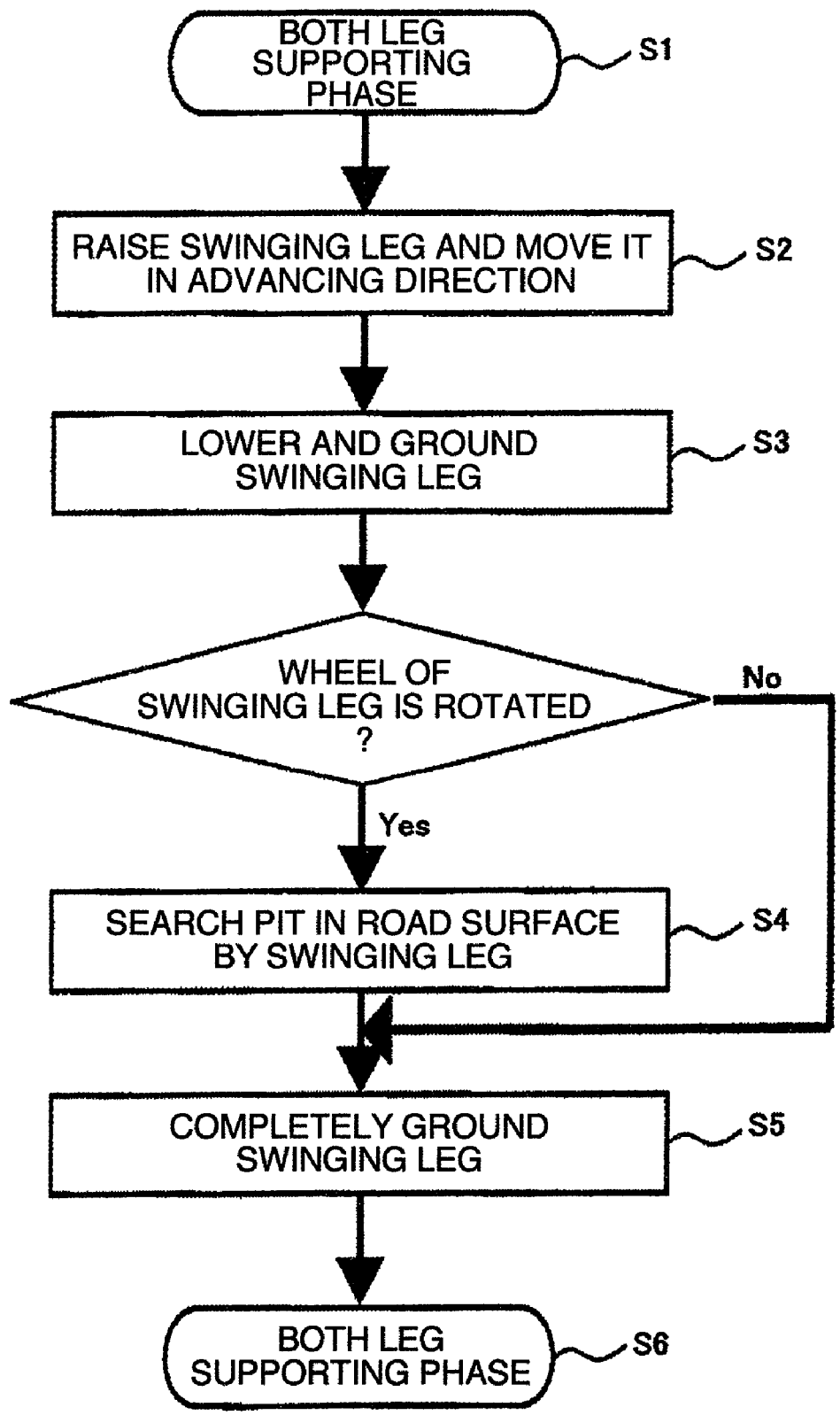
FIG. 4 is a flow chart in the embodiment according to the invention.

FIG. 4 shows a flow chart corresponding to a period in which one step is made from a state in the double-leg supporting phase (S1) to reach the next double-leg supporting phase (S6). It is assumed that the road surface has irregularities but the average inclination is zero.

The state of the double-leg supporting phase (S1) will be described. In this state, both the legs 11R and 11L are completely grounded. It is assumed that the ZMP is present within the convex support polygon formed by the two legs 11R and 11L. At this time, both the legs are subjected to position control for every joint by a supporting leg joint control section 31. The rotation angles of the left and right wheels 14L and 14R are also subjected to position control. Driving torque τ is applied to the wheels by a supporting leg wheel control section 33 on the basis of formula 2 in which θ denotes a wheel rotation angle, and φ denotes a wheel target rotation angle. The wheel rotation angle θ is made coincident with the wheel target rotation angle φ. Here, the letters R and L for denoting the right and left of the wheels are omitted.

$$\tau = K_1(\varphi - \theta) + K_2\left(\frac{d\varphi}{dt} - \frac{d\theta}{dt}\right)$$ Formula (2)

In the above, K1 and K2 mean control gains, and the sum of a value obtained by multiplying K1 with a difference between the target wheel angle φ and the present wheel angle θ, and a value obtained by multiplying K2 with a difference between the target wheel angular velocity dφ/dt and the present wheel angular velocity dθ/dt, is set to be the wheel driving torque τ. K1 and K2 are set on the basis of the PD, LQR control theory and the like at values for returning the position of the leg to an original position even when an external disturbance is input to the leg. The wheel target rotation angle φ is set at the wheel angle θ at the time when the swinging leg is changed to serve as the supporting leg in the preceding step. Here, it is assumed that the right leg 11R is next stepped forward, and in order to prevent the robot 1 from being turned over even when raising the right leg 11R, all the leg joints and the joints 24L and 25L for moving the movable supporting part 15R are controlled so as to make the ZMP present in the convex support polygon formed only by the left leg 11L.

Next, the joint 24R is rotated to release the grounding of the movable supporting part. Then, by moving the joints 21R and 22R, the right leg 11R is raised and moved in the advancing direction as the swinging leg (S2). The ZMP is controlled to be present in the convex support polygon during the period from the state S2 to the state S5. At the time point when the right leg 11R serves as the swinging leg, the driving torque τ of the wheel is given by a swinging leg wheel control section 34 on the basis of formula 3. Here, the letters R and L for representing the right and left of the wheel are also omitted.

$$\tau = K_3\left(\frac{d\varphi}{dt} - \frac{d\theta}{dt}\right)$$ Formula (3)

In the above, K3 denotes a control gain, and the sum obtained by multiplying K3 with a difference between the target wheel angular velocity dφ/dt and the present wheel angular velocity dθ/dt is set to be the wheel driving torque τ. K3 may be of a value different from K2 as described above. The driving torque is set so that the difference between the target wheel angular velocity dφ/dt and the present wheel angular velocity dθ/dt of the wheel 14R converges to zero. Here, the target wheel angular velocity dφ/dt is set at zero.

According to the operation pattern, the right leg 11R is grounded by the wheel (S3). At the moment that the leg is lowered and actually grounded, an external disturbance is applied to the joints 21R and 22R or the wheel 14R. Thus, it is possible to recognize the grounding by incorporating an observer in the joint. For the swinging leg after the grounding, position control having characteristics different for each direction is performed by a swinging leg joint control section 32, in such a manner that the attitude of the leg tends to be changed with respect to external force in the X-axis direction applied by the wheel 14R, and that the attitude of the leg is not changed with respect to external force in the Z-axis direction.

Figure 6:
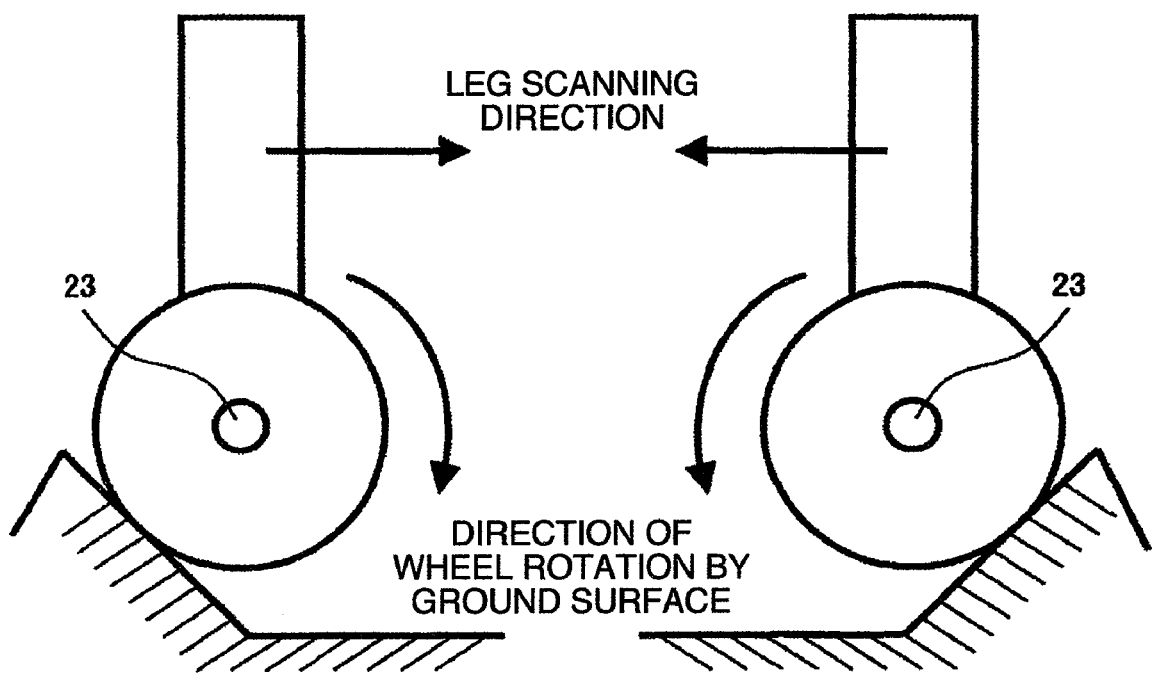
FIG. 6 shows views of irregularities on a road surface and directions of wheel rotation at the time when a free leg is grounded in the embodiment.

When the wheel angular velocity dθ/dt of the wheel 14R is largely different from the target wheel angular velocity dφ/dt at the time that the grounding is recognized, as compared with the state in S2, it is possible to determine that there are irregularities just under the wheel 14R. After the grounding, the wheel 14R is rotated along the irregularities on the road surface as shown in FIG. 6 by applying a load in the Z-axis direction to the wheel 14R, and the position of the joint 23R is moved along the road surface. The target angle of each joint of the swinging leg is changed to a current angle at the time as needed. This enables the wheel 14R to search the recessed part on the road surface (S4).

The moving amount of the wheel 14R is limited because the actual attitude is limited by the length of the leg, torque limits of the joints and the like. Therefore, when the rotation speed of the wheel becomes a fixed value or less, or when the amount of rotation by the wheel becomes a fixed value or more, the wheel 14R is stopped rotating. The rotation of the wheel 14R is stopped when the wheel 14R reaches the recessed part on the road surface. Thus, a wheel position at the time when the rotation of the wheel is stopped or the wheel rotation speed is lowered to a level enough to determine that the road surface is flat, is decided as the point where the right leg 11R should be completely grounded.

The control of the wheel is changed to that by the supporting leg wheel control section 33, and the wheel position is fixed with respect to the ground surface. Further, the position control of the swinging leg is returned to that in the state of S1, and the joints 24R and 25R are moved until the movable supporting part 15R is grounded. The grounding is determined by observers incorporated in the joints 24R and 25R. The right leg 11R is thus completely grounded (S5). Further, the control of the right leg is changed to that by the supporting leg joint control section 31, similarly to S1. Finally, in order to secure subsequent walking and the stability, the joints of the leg are moved so as to make the ZMP present in the convex support polygon formed by the two legs 11R and 11L (S6).

In the above description, the right leg 11R has been explained as the swinging leg, but the operation when the left leg 11L serves the swinging leg is the same as that described.

By performing walking according to the above described procedure, it is possible to surely ground the leg on the recessed part of the irregularities on the road surface, and to realize stable walking. Further, although the case of two legs has been described in the above, the present invention can be applied to the case of three legs or more.

It should be further understood by those skilled in the art that although the foregoing description has been made on the embodiment of the invention, the invention is not limited thereto and various changes and modifications may be made without departing from the spirit of the invention and the scope of the appended claims.

The invention claimed is:

1. A mobile robot comprising:
   a body having a control device and an inclination angle detecting device which detects an inclination angle and an angular velocity of the body with respect to a gravity direction;
   a plurality of legs each having a thigh part and a lower limb part, the thigh part being rotatable around an X-axis, which is a front direction with respect to the body, and around a Y-axis which is a side surface direction with respect to the body;

a wheel provided on a lower portion of the lower limb part and rotatable around the Y-axis;

a movable supporting part provided on the lower portion of the lower limb part separately from the wheel and rotatable around the Y-axis to be grounded on a road surface; and said robot switching its operation according to irregularities of the road surface between coaxial two-wheeled inverted pendulum control operation of moving with the wheels without grounding the movable supporting parts while maintaining inversion, and bipedal walking control operation of walking by controlling the grounding of the wheels and the movable supporting parts on the road surface, said bipedal walking control operation moving said legs while effecting a complete grounding state that the wheels are grounded while being prevented from rotating and the movable supporting parts are also grounded on the road surface, and a wheel grounding state that the wheels are grounded while being permitted to rotate and the movable supporting parts are floated from the road surface.

2. The mobile robot according to claim 1, wherein, when the road surface has few irregularities, the robot folds the movable supporting parts on a side of the wheels without grounding and performs wheel traveling under the coaxial two-wheeled inverted pendulum control operation.

3. The mobile robot according to claim 1, wherein said legs are controlled in a manner that, when the leg is lowered to be grounded during the bipedal walking control operation, the leg is brought into the wheel grounding state that the wheel is grounded while being permitted to rotate and the movable supporting part is floated from the road surface, and the wheel is stopped rotating when a rotation speed of the wheel is a fixed value or less, or when an amount of rotation by the wheel is a fixed value or more.

4. The mobile robot according to claim 1, wherein right and left legs are provided as said legs, and movement of the legs is controlled by the steps of:
(1) raising the right leg and bringing the left leg into a complete grounding state that the wheel of the left leg is grounded on the road surface while being prevented from rotating and the movable supporting part is also grounded on the road surface, to support the whole body of the robot;
(2) lowering the right leg, bringing the right leg into a wheel grounding state that the wheel of the right leg is grounded on the road surface while being permitted to rotate and the movable supporting part of the right leg is floated from the road surface, and searching a point where the right leg is to be grounded, in a manner that when a rotation speed of the wheel is a fixed value or less, or when an amount of rotation performed by the wheel is a fixed value or more, the wheel is stopped rotating;
(3) completely lowering the right leg and bringing both the legs in the complete grounding state to support the whole body of the robot;
(4) raising the left leg and bringing the right leg in the complete grounding state to support the whole body of the robot;
(5) lowering the left leg, bringing the left leg into the wheel grounding state that the wheel of the left leg is grounded on the road surface while being permitted to rotate and the movable supporting part of the left leg is floated from the road surface, and searching a point where the left leg is to be grounded, in a manner that when a rotation speed of the wheel is the fixed value or less, or when an amount of rotation performed by the wheel is the fixed value or more, the wheel is stopped rotating; and
(6) completely lowering the left leg and bringing both the legs in the complete grounding state to support the whole body of the robot.

5. The mobile robot according to claim 1, wherein right and left legs are provided as said legs, and the wheels are driven by motors having an angle detecting function.

6. A mobile robot comprising:
a body having a control device and an inclination angle detecting device which detects an inclination angle and an angular velocity of the body with respect to a gravity direction; and
a plurality of legs each having a thigh part and a lower limp part, the thigh part rotatable around an X-axis which is a front direction with respect to the body, and around a Y-axis which is a side surface direction with respect to the body, a wheel provided on a lower portion of the lower limb part for rotation around the Y-axis, and a movable supporting part provided separately from the wheel on the lower portion of the lower limb part and movable separately from the wheel for rotation around the Y-axis,
wherein:
when a road surface has few irregularities, a coaxial two-wheeled inverted pendulum control operation is performed to fold the movable supporting parts on a side of the wheels of the legs and travel with the wheels without grounding the movable supporting parts on the road surface, and
when the road surface has large irregularities, a bipedal walking control operation is performed to walk with the legs in one of a complete grounding state and a wheel grounding state, the complete grounding state indicating that the wheels are grounded on the road surface while being prevented from rotating and the movable supporting parts are grounded on the road surface, and the wheel grounding state indicating that the wheels are grounded while being permitted to rotate and the movable supporting parts are floated from the road surface.

7. The mobile robot according to claim 6, wherein right and left legs are provided as the legs, and the wheels are driven by motors having an angle detecting function.

8. The mobile robot according to claim 7, wherein the bipedal walking control operation is performed by shifting the following states:
(1) raising the right leg and bringing the left leg into the complete grounding state that the wheel of the left leg is grounded on the road surface while being prevented from rotating and the movable supporting part is also grounded on the road surface, to support the whole body of the robot;
(2) lowering the right leg, bringing the right leg into the wheel grounding state that the wheel of the right leg is grounded on the road surface while being permitted to rotate and the movable supporting part of the right leg is floated from the road surface, and searching a point where the right leg is to be grounded;
(3) completely lowering the right leg and bringing both legs in the complete grounding state to support the whole body of the robot;
(4) raising the left leg and bringing the right leg in the complete grounding state to support the whole body of the robot;

(5) lowering the left leg, bringing the left leg into the wheel grounding state that the wheel of the left leg is grounded on the road surface while being permitted to rotate and the movable supporting part of the left leg is floated from the road surface, and searching a point where the left leg is to be grounded; and (6) completely lowering the left leg and bringing both legs in the complete grounding state to support the whole body of the robot.

* * * * *